United States Patent [19]
Sakurai et al.

[11] 3,814,982
[45] June 4, 1974

[54] SIDE PINCUSHION DISTORTION CORRECTION CIRCUITRY

[75] Inventors: Masami Sakurai, Yokohama; Saburou Tsuruta, Tokyo, both of Japan

[73] Assignee: Tokyo Shibaura Electric Co., Ltd., Kawashiki-shi, Japan

[22] Filed: Feb. 8, 1973

[21] Appl. No.: 330,673

[30] Foreign Application Priority Data
Feb. 15, 1972 Japan .............................. 47-15840

[52] U.S. Cl. .............................. 315/27 GD, 315/24
[51] Int. Cl. .............................................. H01j 29/70
[58] Field of Search....... 315/27 SR, 27 TD, 27 GD, 315/24

[56] References Cited
UNITED STATES PATENTS

| | | | |
|---|---|---|---|
| 3,444,422 | 5/1969 | Wolber | 315/27 SR |
| 3,611,004 | 10/1971 | Smith | 315/27 SR |
| 3,732,458 | 5/1973 | Wolber | 317/27 SR |

*Primary Examiner*—T. H. Tubbesing
*Assistant Examiner*—J. M. Potenza
*Attorney, Agent, or Firm*—Flynn & Frishauf

[57] ABSTRACT

A side pincushion distortion correction circuit which is supplied with drive current having a parabolic wave form synchronizing with a vertical deflection current signal comprises a saturable reactor connected in series with a horizontal deflection coil and an additional saturable reactor connected equivalently in parallel with said horizontal deflection coil, said additional reactor having its unductance varied in the opposite direction to that of the first mentioned reactor.

7 Claims, 12 Drawing Figures

SIDE PINCUSHION DISTORTION CORRECTION CIRCUITRY

This invention relates to a side pincushion correction circuit.

A colour television receiving set has its colour picture tube or cathode ray device fitted with such a deflection coil as creates a uniform deflection electromagnetic field in order to minimize distortions of convergence and colour purity. However, the application of such deflection coil generally causes the raster to present pincushion distortions. This event is supposed to arise for the following reason. The spot of the electron beam scanning the fluorescent surface is shifted out of proportion to its deflection angle and is moved more quickly toward the end of the fluorescent surface, causing the scanning lines to be extended at the end. Where the spot of the electron beam is deflected to provide a raster, angles most deflected horizontally and vertically from the central line of the fluorescent surface fall on the four corners of the raster. Consequently, the spot of the electron beam is more shifted in said corner sections of the raster than in the other sections, resulting in the formation of the so-called pincushion-shaped raster.

With a colour television receiving set, said pincushion-shaped distortion is generally corrected by controlling the amount of current flowing through the deflection coil. Particularly for correction of side pincushion distortions is generally used a correction circuitry provided with a saturable reactor. Said saturable reactor has its output or secondary winding connected in series with the horizontal deflection coil and its input or primary winding supplied with drive current of parabolic wave form synchronizing with a vertical deflection current signal. The saturable reactor causes an inductance component acting in series with the horizontal deflection coil to be varied with the parabolic wave form of drive current synchronizing with the vertical deflection current signal, thus correcting said side pin-cushion distortions by modulating the amplitude of the horizontal deflection current with said vertical deflection drive current.

This process of correcting pincushion distortions is indeed effective without exerting the later described harmful consequence to the circuits surrounding the horizontal output circuit of a device provided with a cathode ray tube bearing a relatively small deflection angle of 90°. But in the case of a cathode ray tube deflected at a broad angle, for example, more than 110°, the required amount of correction increases 1.5 to 1.8 times over that for a 90° deflected cathode ray tube. Accordingly, such large scale correction not only minimizes its own effect but also adversely affects the aforesaid circuits surrounding the horizontal output circuit. Namely, horizontal flyback pulses occurring in a horizontal deflection circuit provided with a circuitry for correcting pincushion distortions are excessively modulated in amplitude and pulse width for the later described reason by drive current of parabolic wave form synchronizing with a vertical deflection current signal. Accordingly, the circuits surrounding the horizontal output circuit which are supplied with said horizontal flyback pulses are subject to the following difficulties. For example, where a horizontal automatic frequency control circuit is supplied with said horizontal flyback pulses as a comparison signal, then a horizontal deflection signal has its phase shifted by the change in the amplitude and pulse width of said horizontal flyback pulses, causing the longitudinal lines of an image appearing in the raster to be distorted. Further, high voltage derived from rectification of the horizontal flyback pulses gives rise to ripples in synchronization with a vertical deflection signal. Said high voltage which is used, for example, as the voltage of the anode of the colour cathode ray tube sometimes rather increases side pincushion distortions. Change of the image brightness by control of current from the high voltage circuit sometimes results in the complicated voltage ripples and in consequence the intricate wavering of the raster. Further, rippling high D.C. voltage fluctuates the amount of current supplied to the horizontal deflection circuit. Therefore, the high internal impedance of a power source leads to impression of varying voltage with the more noticeable appearance of side pincushion distortions.

This invention has been accomplished with the view of eliminating the aforesaid drawbacks of the prior art colour television receiving set and is intended to provide a circuit for correcting side pincushion distortions wherein an additional saturable reactor whose inductance changes in the opposite direction to that of the saturable reactor for side pincushion distortion correction is connected equivalently in parallel with a horizontal deflection circuit, thereby preventing the variations of amplitude and pulse width of the horizontal flyback pulses.

SUMMARY OF THE INVENTION

In a pincushion distortion correction circuitry according to this invention, the output winding of a saturable reactor used in correcting side pincushion distortions is connected in series with a horizontal deflection coil. The input winding of said saturable reactor is supplied with drive current of parabolic wave form synchronizing with a vertical deflection current signal. Accordingly, variation in the secondary inductance of said saturable reactor causes deflection current flowing through the horizontal deflection coil to present a change according to the parabolic wave form of said drive current. The additional saturable reactor connected, as described above, equivalently in parallel with the horizontal deflection circuit is so designed as to present an inductance change in the opposite direction to that of the saturable correction reactor.

The present invention can be more fully understood from the following detailed description when taken in connection with the accompanying drawings, in which:

FIG. 1 shows an equivalent circuit of a horizontal deflection output circuit;

FIG. 2 presents an equivalent circuit of a horizontal deflection output circuit including a side pincushion distortion correction circuit according to an embodiment of this invention;

Figure 4:
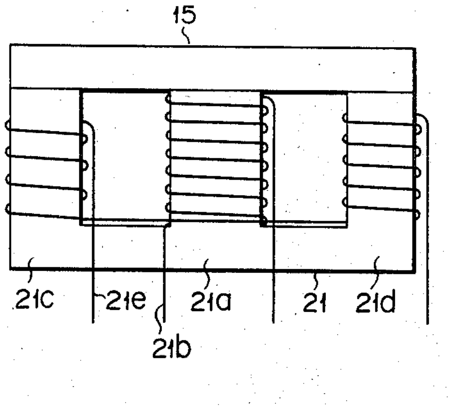
Figure 5:
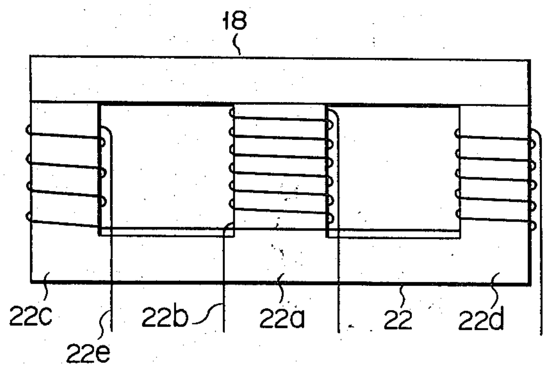
Figure 6:
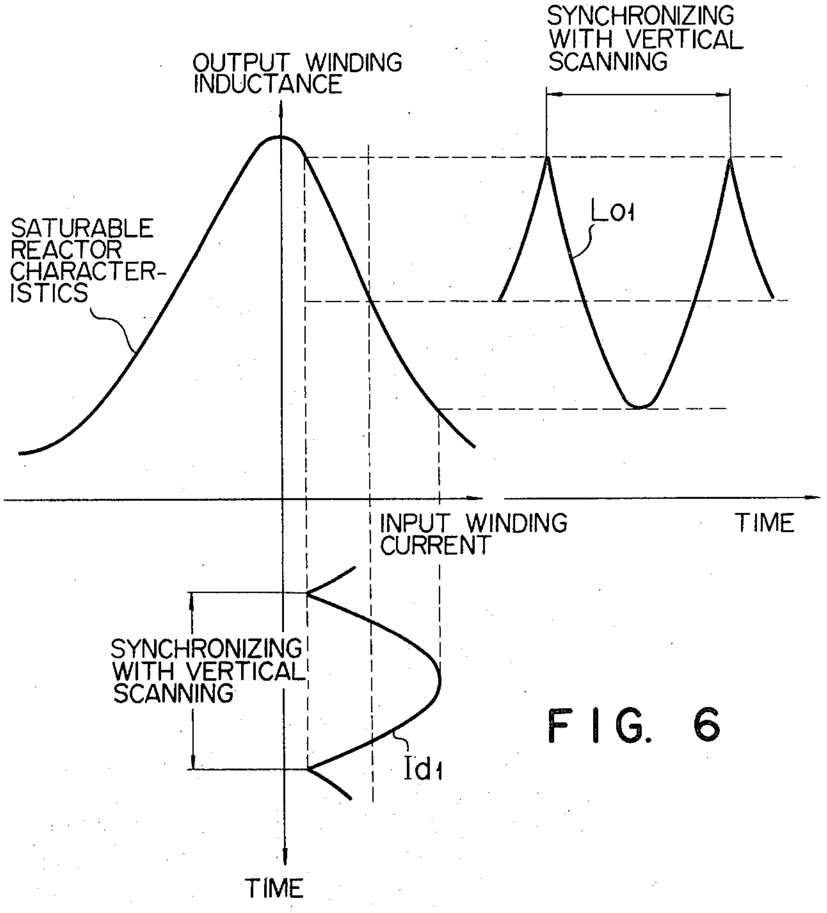
Figure 7:
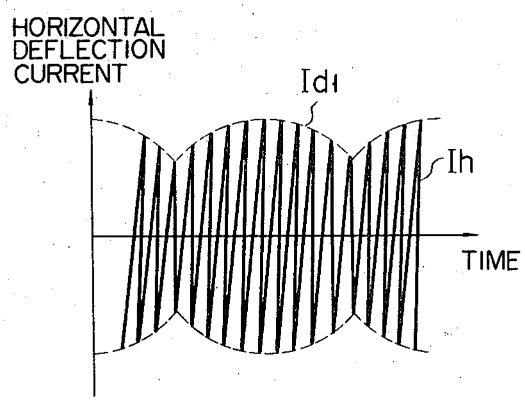
Figure 8:
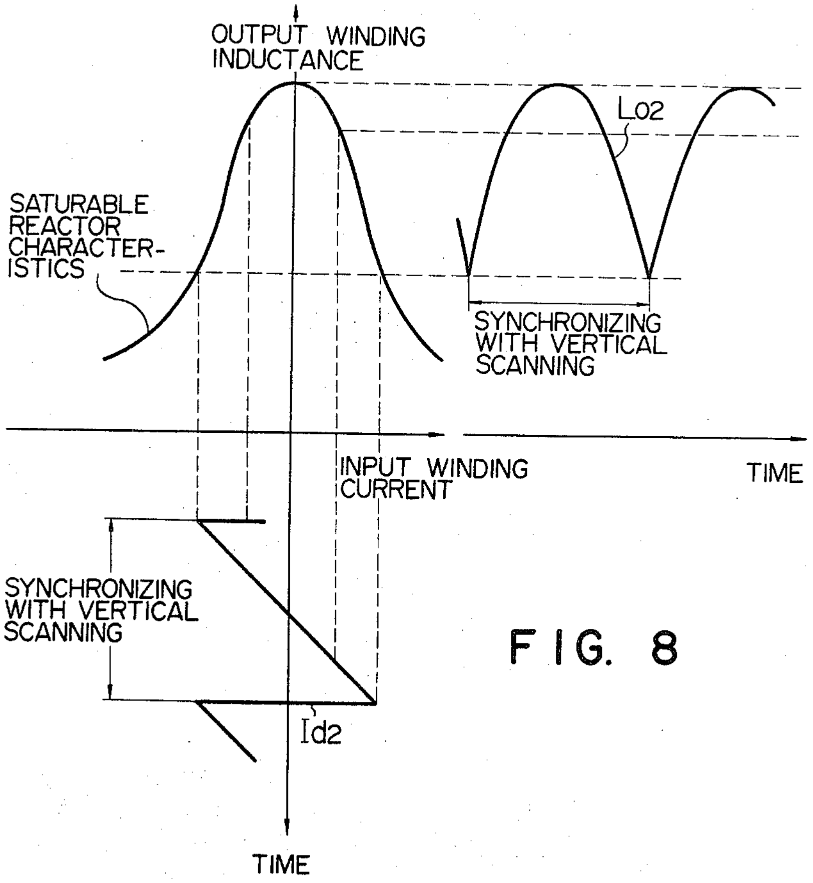
Figure 9:
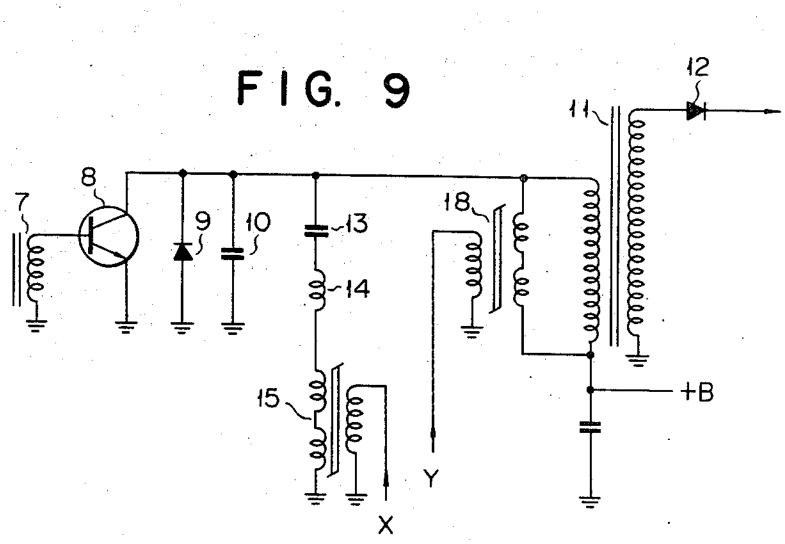
Figure 10:
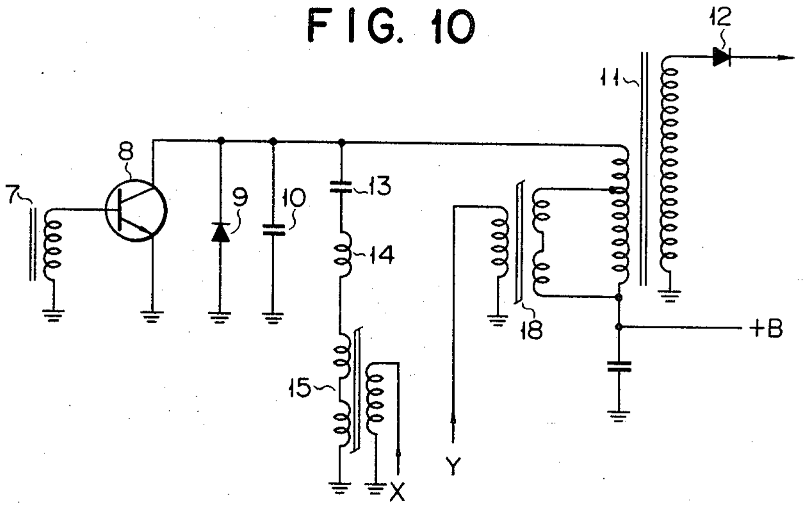
Figure 11:
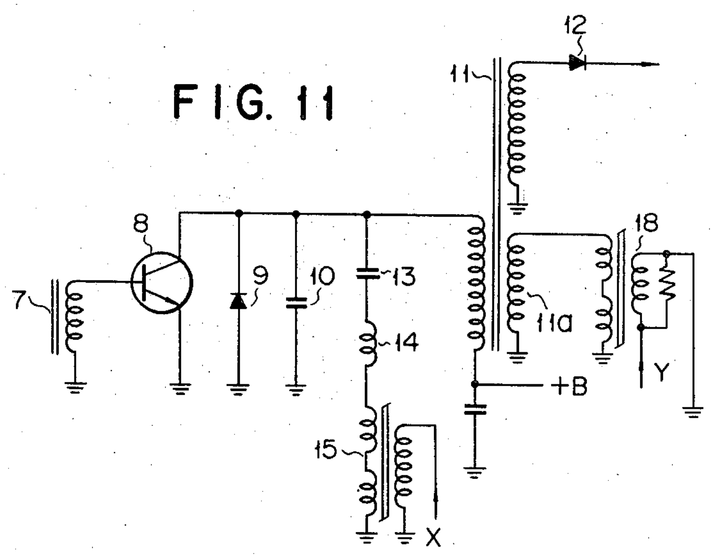

FIG. 4 schematically illustrates a saturable reactor for correcting side pincushion distortions;

FIG. 5 is a schematic representation of an additional saturable reactor;

FIG. 6 is a curve diagram showing the relationship of the primary winding current and secondary inductance of the saturable correction reactor;

FIG. 7 shows the wave form of current flowing through a horizontal deflection coil;

FIG. 8 is a curve diagram showing the relationship of the primary winding current and secondary inductance of the additional saturable reactor;

FIGS. 9 and 10 show side pincushion distortion correction circuitry according to other embodiments of the invention wherein the additional saturable reactor is connected to the primary side of a horizontal output transformer; and FIG. 11 is a concrete diagram of said pincushion distortion correction circuitry according to still another embodiment of the invention wherein the additional saturable reactor is connected to the secondary side of a horizontal output transformer.

For better understanding of this invention, there will now be described a horizontal deflection output circuit provided with the side pincushion distortion correction circuitry of the invention.

Figure 1:
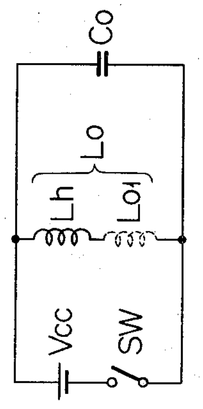

It is well known that the horizontal deflection circuit comprises, as shown in the equivalent circuit of FIG. 1, a serial circuit of an electronic switch SW and D.C. source Vcc to which an inductance L0 and capacitance C0 are connected in parallel. The inductance L0 is generally considered substantially equal to the selfinductance Lh of the horizontal deflection coil, and the capacitance C0 is a resonance capacitance, where the inductance L01 of the output winding of the usual saturable reactor used in the side pincushion distortion correction circuitry is connected in series with the inductance Lh of the horizontal deflection coil, then there results the following equation:

$$L0 = Lh + L01 \ldots\ldots\ldots \quad (1)$$

In such horizontal deflection circuit, the amplitude Vc of horizontal flyback pulses may be indicated by the following equation:

$$Vc = Vcc\,\{\pi/2\,(tH/tR - 1) + 1\} \ldots\ldots \quad (2)$$

where:

$tH$ = period of horizontal scanning (constant)

$tR$ = period of horizontal flyback

The above equation shows that since tH is constant by the fixed horizontal synchronization, horizontal flyback pulses alone vary in amplitude Vc with the period tR of horizontal flyback. Said horizontal flyback period tR or the pulse width of horizontal flyback pulses may be expressed as $$tR = \pi\sqrt{L0Co} \ldots\ldots \quad (3)$$

Figure 2:
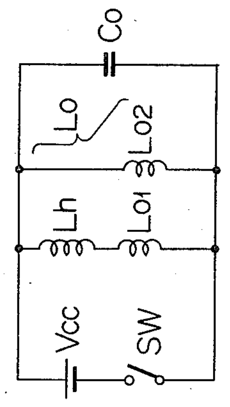

Since C0 is constant, variation in the inductance L0 eventually leads to change in the amplitude Vc of horizontal flyback pulses. With the prior art colour television receiving set, the inductance L0 varies, as indicated by the equation (1), more prominently with the inductance L01 of the saturable reactor according as scanning electron beams are deflected more broadly. The prominently varying the inductance L01 exerts, as previously described, a harmful effect on circuits surrounding the horizontal output circuit such as a horizontal automatic frequency control circuit and high voltage rectifying circuit. With the circuitry of this invention, therefore, the inductance L02 of the secondary winding of an additional reactor is connected in parallel with a serial circuit consisting of the inductance Lh of the horizontal deflection coil and the inductance L01 of the saturable correction reactor as shown in the theoretically equivalent circuit of FIG. 2. Further, the inductance L02 of the additional saturable reactor is made to change in the opposite direction to the inductance L01 of the saturable correction reactor, thereby rendering a composite inductance L0 indicated, for example, by the following equation (4) substantially constant.

$$L0 = (Lh + L01)L02/(Lh + L01) + L02 \ldots\ldots \quad (4)$$

According to this invention, the inductances L01 and L02 vary in the opposite directions, namely, the larger the inductance L01, the smaller the inductance L02 and conversely, the smaller the inductance L01, the larger the inductance L02. Such type of variation in the inductances L01 and L02 substantially fixes the composite equivalent inductance L0. Now let the maximum and minimum values of these inductances L01 and L02 be designated as L01 max, L01 min and L02 max and L02 min respectively. Then the side pincushion distortion correction circuitry according to one embodiment of this invention is so arranged as to obtain the following equation:

$$L0 = (Lh + L01\,min)L02\,max/Lh +.\ L01\,min) + L02\,max = (Lh + L01\,max)L02\,min/(Lh + L01\,min) + L02\,min \ldots\ldots \quad (5)$$

A composite inductance L0 thus formed remains substantially constant regardless of variation in the inductance L01 of the saturable reactor, with the result that horizontal flyback pulses are kept substantially unchanged in amplitude and pulse width as shown in the equations (2) and (3). The side pincushion distortion correction circuitry of this invention is conceptionally based on the abovementioned principle.

Figure 3A:
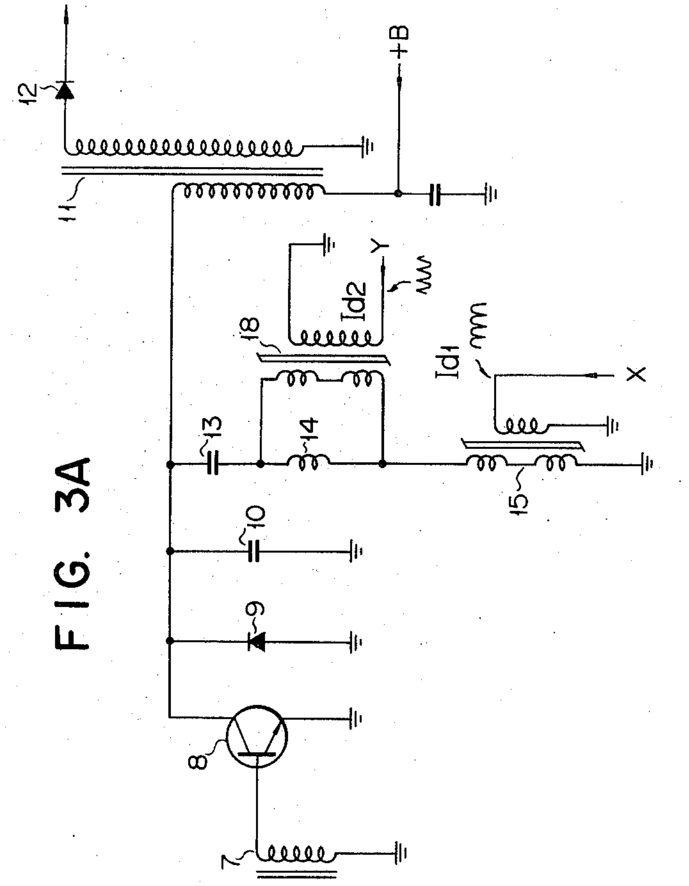
FIG. 3A is a concrete diagram of a side pincushion distortion correction circuit of said embodiment.
Figure 3B:
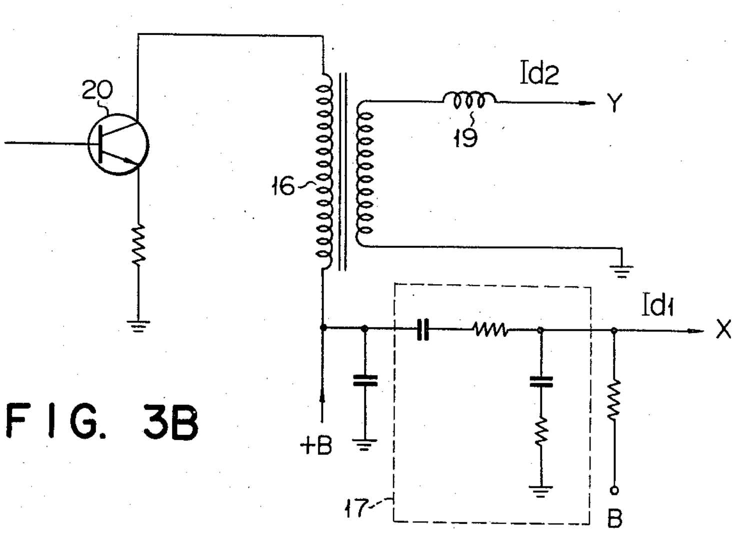
FIG. 3B is a diagram of a drive current circuit connected to the circuitry of FIGS. 3A, 9, 10 and 11.

There will now be further detailed said correction circuitry by reference to FIGS. 3A and 3B. A horizontal deflection output transistor 8 whose base is connected to an input transformer 7 has its collector connected to a damper diode 9 and resonance capacitor 10, and also to the primary winding of a horizontal output transformer or flyback transformer 11, whose secondary winding is connected to a rectification diode 12 designed to provide high voltage by rectifying horizontal flyback pulses. While FIG. 3A shows a single diode 12 of such rectification type, there may be actually used a plurality of rectification diodes according to the number of circuits surrounding the horizontal output circuit which require D.C. voltage obtained by rectifying horizontal flyback pulses. Said flyback transformer 11 is also connected to an automatic frequency control circuit (not shown). The horizontal deflection output transistor 8 has its collector grounded through a capacitor 13 for correcting S-shaped deformations, horizontal deflection coil 14 and the secondary winding of a saturable correction reactor 15. One end X of the primary winding of said saturable reactor 15 is connected to one end of the primary winding of a vertical output transformer 16 of FIG. 3B through an integration circuit or a circuit 17 for rectifying parabolic waves. The opposite end of the primary winding of the saturable reactor 15 is grounded. Those portions of the subject circuitry which have been described above correspond to the prior art horizontal deflection circuit system including side pincushion distortion correction circuitry.

In contrast, the side pincushion distortion correction circuitry of this invention has the output winding or secondary winding of an additional saturable reactor 18 connected in parallel with the horizontal deflection coil 14. The input winding or primary winding of the additional reactor 18 is so connected to a vertical deflection input circuit as to cause drive current synchronizing with a vertical deflection current signal to be introduced into said output circuit. The wave form of the drive current Id2 is defined according to that of drive current Id1 running through the primary winding of the saturable reactor 15. Since the latter drive current Id1 generally has such a parabolic wave form as shown, the former drive current Id2 is preferably desired to have a parabolic wave form of opposite polarity. In this case, the drive current Id2 whose parabolic wave has been rectified by an integration circuit is introduced into the subject side pincushion distortion correction circuitry at the end Y of the primary winding of the additional saturable reactor 18. In practice, however, it is possible, as described later, to use saw-tooth wave drive current for vertical deflection so as to match the saturability characteristics of saturable reactors. In this case, the Y terminal of the vertical output circuit of FIG. 3B is connected to the Y terminal of the additional saturable reactor 18 included in the distortion correction circuitry of FIG. 3A. The primary winding of the additional saturable reactor 18 is connected to the secondary winding of a vertical output transformer 16 through a vertical deflection coil 19. To the opposite end of the primary winding of the vertical output transformer 16 is connected the collector of a vertical output transistor 20. Referring to FIG. 3B, the known vertical deflection output circuit mainly comprises a transistor 20, transformer 16 and deflection coil 19. The saturable reactor 15 for correcting side pincushion distortions is provided, as shown in FIG. 4, with input winding or primary winding 21*b* wound about the middle leg 21*a* of an EI core 21 and output winding or secondary winding 21*e* wound about the side legs 21*c* and 21*d* of said EI core 21. On the other hand, the additional saturable reactor 18 includes, as shown in FIG. 5, input winding or primary winding 22*b* wound about the middle leg 22*a* of an EI core 22 and output winding or secondary winding 22*e* wound about the side legs 22*c* and 22*d* of said EI core 22. These saturable reactors 15 and 18 which are of the known arrangement have the input windings 21*b* and 22*b* supplied with drive current to saturate the cores 21 and 22, thereby varying the inductance of the output windings 21*e* and 22*e* according to the magnitude of drive current. The equivalent circuit of FIG. 3A is of the same arrangement as that of FIG. 2.

There will now be described the operation of the subject side pincushion distortion correction circuitry arranged as described above. The primary winding of the saturable reactor 15 for correction of side pincushion distortions is supplied with drive current Id1 of parabolic wave form synchronizing with a vertical deflection current signal shown in FIGS. 3A and 6. Accordingly, the inductance of the secondary winding of said saturable reactor 15 varies as indicated by the curve L01 of FIG. 6. Referring to a single wave form of the drive current, a minimum drive current results in a maximum inductance on the secondary side, minimizing the horizontal deflection current. A maximum drive current leads to a minimum inductance on the secondary side, maximizing the horizontal deflection current. At the fall of the drive current, the secondary side inductance is shifted from a minimum to a maximum state, causing the horizontal deflection current to vary accordingly. In other words, variation of said horizontal deflection current may be taken to mean that the horizontal deflection current Ih had its amplitude modulated by the drive current Id1 as illustrated in FIG. 7. Flow of the horizontal deflection current Ih of FIG. 7 through the horizontal deflection coil 14 causes the horizontal amplitude of the raster to increase toward the central axis thereof, thereby attaining the correction of side pincushion distortions. At this time, horizontal flyback pulses appearing in the flyback transformer 12 tend to be modulated, as previously described, by the drive current. According to this invention, however, the additional saturable reactor 18 is connected in parallel with the horizontal deflection coil 14, thereby preventing the modulation of said pulses by the action of said additional satuable reactor 18 based on the same principle as in the equivalent circuit of FIG. 2.

There will now be described the action of said additional saturable reactor 18. The primary winding of the reactor 18 is supplied with vertical deflection current as drive current Id2 having a saw-tooth wave form illustrated in FIG. 8 through the vertical deflection coil 19. The secondary inductance L02 of the additional saturable reactor 18 has its value changed from the saw-tooth wave form to the parabolic wave form shown in FIG. 8 due to the saturable nature of said reactor 18. Said additional saturable reactor 18 is so designed that its secondary inductance L02 varies in the opposite direction to the secondary inductance L01 of the saturable correction reactor 15, namely, a large secondary inductance L01 of the reactor 15 leads to a small secondary inductance L02 of the additional reactor 18 and vice versa. In other words, the variations of both secondary inductances L01 and L02 offset each other, keeping the composite inductance L0 indicated, for example, by the equation (4) equivalently unchanged. As a result, the horizontal flyback pulses present always uniform amplitude and pulse width to enable the normal correction of said pincushion distortions and save the screen image free from deformations due to rippleless high voltage as well as the satisfactory operation of the horizontal automatic frequency control circuit and convergence circuit.

With the inductance Lh of the horizontal deflection coil set at 0.9 mH and the inductance L02 of the saturable correction reactor 15 taken to vary from 20 to 100 $\mu$H, then the inductance L01 of the additional satuable reactor 18 actually varied from 41.4 to 9 mH.

In the foregoing embodiments, the additional saturable reactor 18 was directly connected in parallel to the horizontal deflection coil 14. However, said additional saturable reactor 18 may be connected, as shown in FIG. 9, in parallel to the primary winding of the horizontal output transformer 11 or, as shown in FIG. 10, similarly connected to said winding through an intermediate tap provided on said winding. Further, it is possible to provide additional secondary winding 11a on the secondary side of the horizontal output transformer 11 in the prescribed winding ratio to the main secondary winding of said transformer 11 and connect the additional saturable reactor 18 in parallel to said additional secondary winding 11*a*. This arrangement has the advantage that the withstand voltage of said transformer 11 can be easily designed and said additional saturable reactor 18 may be a type of small capacity having a low inductance of, for example, 5 mH.

What we claim is:

1. In side pincushion distortion correction circuitry for a colour television receiving set which comprises a first saturable reactor having an input winding connected to a vertical deflection circuit and an output winding having its inductance varied with a drive current synchronizing with a vertical deflection current signal running through said input winding, said output winding being connected in series with a horizontal deflection coil attached to a horizontal output transformer included in a horizontal deflection output circuit so as to generate also horizontal flyback pulses, the improvement comprising:

a second saturable reactor provided with an input winding connected to the vertical deflection circuit and an output winding connected equivalently in parallel with the horizontal deflection coil such that the inductance of said output winding of said second saturable reactor is varied with drive current synchronizing with a vertical deflection current signal introduced through said input winding of said second saturable sector;

and means for supplying said drive current to the second saturable reactor such that the inductance of the output winding of the second saturable reactor varies in the opposite direction to the inductance variation of the output winding of the first saturable reactor to maintain the composite inductance of said reactors substantially constant, whereby the horizontal flyback pulses are substantially unchanged in amplitude and pulse width regardless of the inductance variation of the first saturable reactor.

2. A circuit according to claim 1 wherein said drive current supplying means to introduces input current of parabolic wave form synchronizing with a vertical deflection current signal.

3. A circuit according to claim 1 wherein said drive current supplying means introduces input current of saw-tooth wave form synchronizing with a vertical deflection current signal.

4. A circuit according to claim 1 wherein the output winding of the second saturable reactor is directly connected in parallel with the horizontal deflection coil.

5. A circuit according to claim 1 wherein the output winding of the second saturable reactor is directly connected in parallel with the horizontal output transformer.

6. A circuit according to claim 1 wherein the output winding of the second saturable reactor is connected in parallel with the secondary winding of the horizontal output transformer.

7. A circuit according to claim 1 wherein said horizontal deflection output circuit is a transistorized circuit.

* * * * *